July 24, 1956  J. C. MURRAY  2,755,811
PORTABLE FOLDING GARAGE
Filed Oct. 8, 1953  2 Sheets-Sheet 1

John C. Murray
INVENTOR.

BY *Clarence A. O'Brien
and Harvey B. Jacobson*
Attorneys

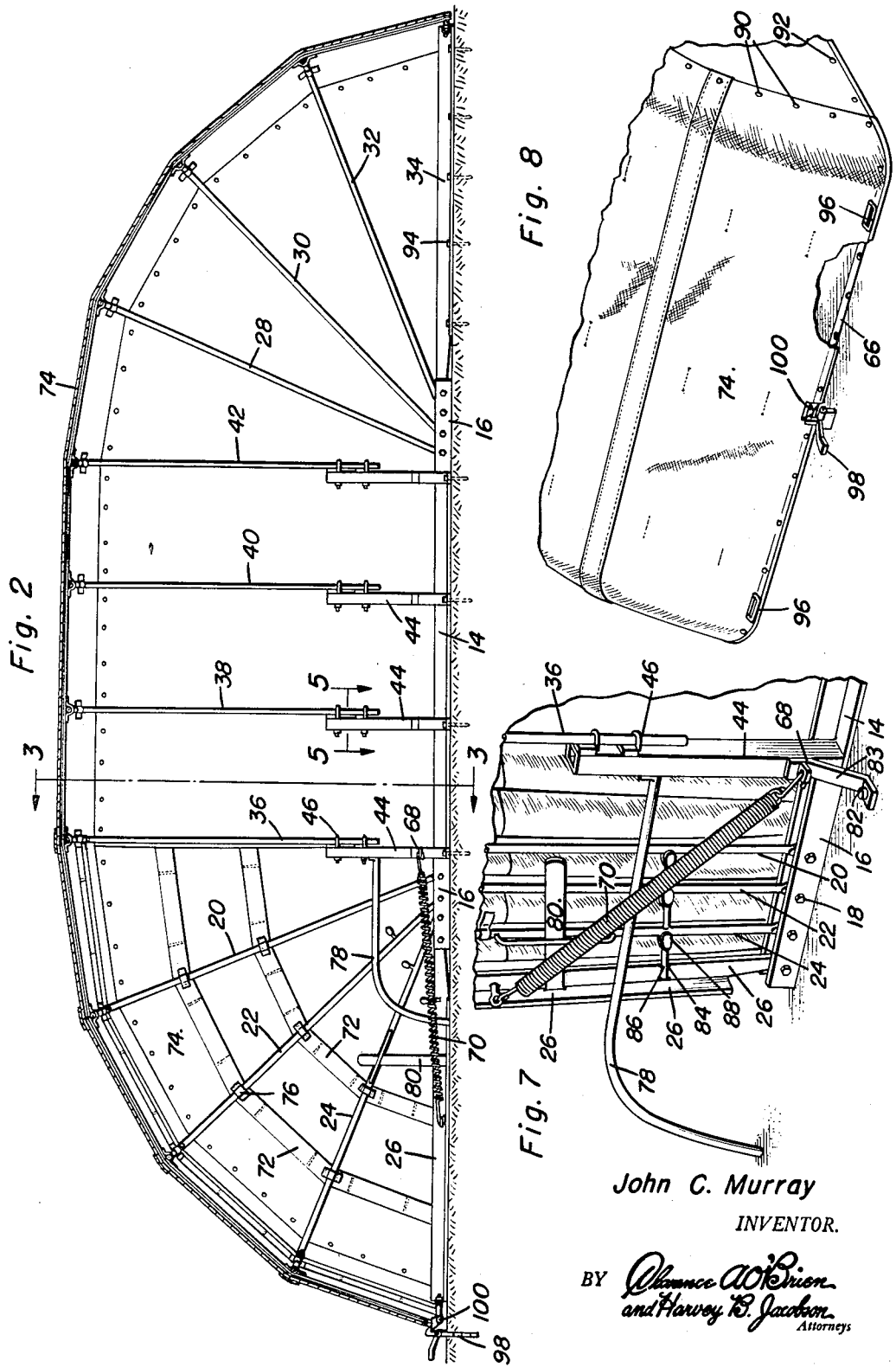

United States Patent Office 2,755,811
Patented July 24, 1956

2,755,811

PORTABLE FOLDING GARAGE

John C. Murray, Great Bend, Kans.

Application October 8, 1953, Serial No. 384,934

1 Claim. (Cl. 135—4)

This invention relates to an easily erected folding garage adapted to be used for the protection of automobiles and like vehicles.

The primary object of the present invention resides in the provision of a foul weather garage for use in protecting automobiles and like vehicles during inclement weather and from deterioration due to strong rays from the sun and the like.

A further object of the invention resides in the provision of a folding garage adapted to withstand strong winds, hail, snow, and dust so as to provide protection for a vehicle therewithin, and which folding garage is provided with a folding door which may be opened so that the vehicle may be driven into or out from the folding garage with great facility.

The construction of this invention features a pair of spaced parallel base runners which have spaced ribs pivotally secured thereto. Spaced frames are also rigidly connected to the base runners and extend vertically upwardly therefrom. Secured over the ribs and the frames is a fabric covering. Utilized in adjusting the position of the fabric when the ribs are in a closed position is a plurality of bands of elastic material.

Still further objects and features of this invention reside in the provision of a folding garage that is strong and durable, simple in construction and manufacture, light in weight, and capable of being readily collapsed for transportation from one location to another, yet which is relatively inexpensive to manufacture, thereby permitting wide distribution.

These, together with the various ancillary objects and features of the invention which will become apparent as the following description proceeds, are attained by this folding garage, a preferred embodiment of which has been illustrated in the accompanying drawings, by way of example only, wherein:

Figure 2 is a vertical, sectional view in an enlarged scale of the folding garage;

Figure 7 is a partial perspective view illustrating the arrangement of parts with the ribs in an open position and further illustrating the springs utilized in holding the ribs in an open position together with the stabilizer bar attached to one of the frame members; and Figure 8 is a partial perspective view illustrating the manner of latching the ribs in a closed position.

Figure 1:
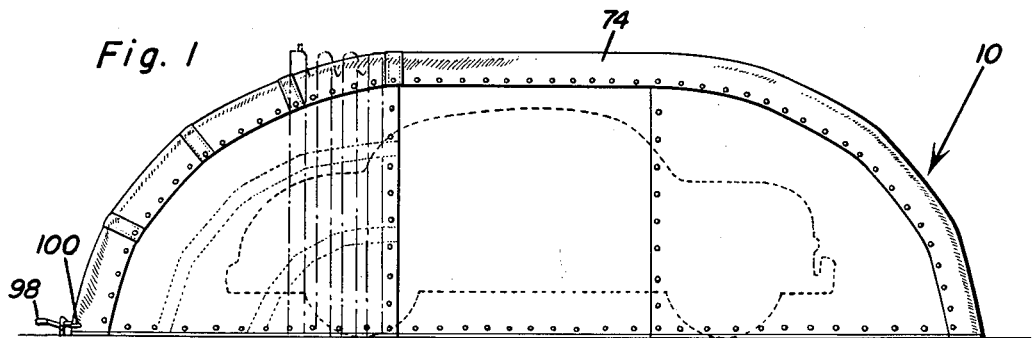
Figure 1 is a side elevational view of a garage constructed in accordance with the concepts of the present invention and showing a vehicle as received therein.

With continuing reference to the accompanying drawings wherein like reference numerals designate similar parts throughout the various views, reference numeral 10 generally designates the folding garage comprising the present invention. This folding garage includes a pair of base runners 12 and 14 constructed from angle iron or the like. The ends of the base runners 12 and 14 have affixed thereto plates such as that indicated at 16. The plates 16 are provided with apertures therethrough in alignment with other apertures formed in the upwardly extending flanges of the base runners 12 and 14 so as to provide means for mounting pins or the like 18 on which ribs such as are indicated at 20, 22, 24, and 26 and 28, 30, 32, and 34 are rotatably mounted. Also vertically upwardly extending from the base members 12 and 14 are substantially U-shaped frames 36, 38, 40, and 42 which are composed of various elements.

Each of the frames 36, 38, 40, and 42 are of similar construction and consist of a pair of spaced standards 44 that rise from the runners 12 and 14. The standards 44 are preferably square and tubular in shape and have substantially J-shaped bolts 46 extending therethrough for clampingly holding upwardly extending rods 48 in position. The rods 48 have arcuately inwardly curved upper portions 50 and carry tubular connectors 52 for receiving the ends of upper transverse rods 54 which are held in an adjusted position by means of set screws 56. The ribs 20, 22, and 24, and 28, 30, and 32 are of similar construction and include transverse members 58 which are lockingly held in position by means of set screws 60 within tubular connectors 62 carried by the arcuate portion 64 of the upwardly extending portions of the ribs. The outer rib 26 is of somewhat different construction, being manufactured from angle iron provided with a transverse rod 66 attached thereto. The rib 34 is of similar construction to the rib 26.

Figure 3:
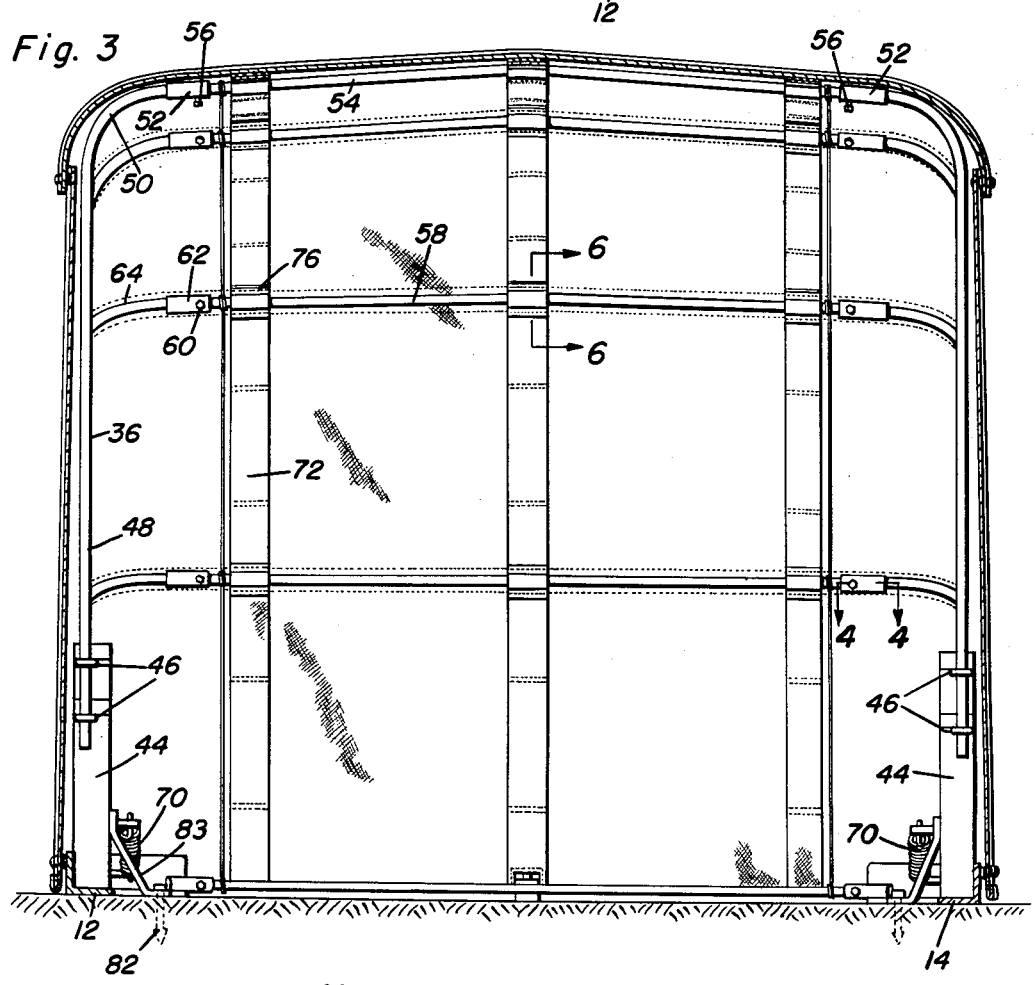
Figure 3 is an enlarged vertical sectional view as taken along the plane of line 3—3 in Figure 2.
Figures 4, 5, 6:
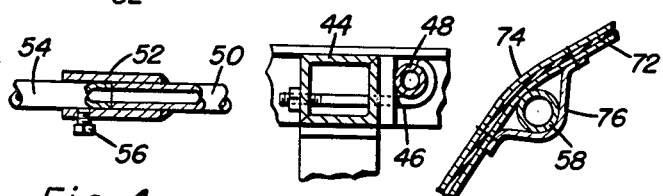
Figure 4 is a sectional detail view as taken along the plane of line 4—4 in Figure 3 and illustrating the manner in which the component elements of the ribs are secured to each other.
Figure 5 is a sectional detail view as taken along the plane of line 5—5 in Figure 2 and illustrating the manner of construction of the frame members.
Figure 6 is a sectional detail view as taken along the plane of line 6—6 in Figure 3 and illustrating the construction of the bands of elastic and the manner in which the fabric covering is secured to the frame and rib members.

Journally secured to the rib 26 and to eyes 68 mounted on the standards 44 are springs 70. Inasmuch as the ends of the springs 70 are attached to the standards 44 at a position above the base runners 12 and 14, the springs 70 will urge the lower rib 26 to an open position. Joining the rib 26 with the ribs 24, 22, and 20 are elastic bands such as indicated at 72 which are affixed to a fabric covering 74 which is positioned over and about all of the ribs and all of the frames. The elastic bands 72 have strips 76 sewn thereto which embrace the ribs 20, 22, and 24. Likewise the fabric covering 74 is affixed to the base runners 12 and 14 and to the ribs 26 and 34, by suitable fasteners. Hence, when the rib 26 is held in an open position by the spring 70, the ribs 24, 22, and 20 will likewise be held in an open position such as is shown in Figure 7 or in the dotted lines in Figure 1. However, when the ribs are closed as shown in Figures 2 and 3, the elastic band 72 will be stretched. The band 72 will tend to tighten up the slack in the fabric covering 74 when the doors are in an open position.

Secured to the standards 44 are a pair of spaced arcuate stabilizer rods 78 which guide the movement of the ribs 20, 22, 24, and 26 and minimize wobble in the ribs. Likewise, attached to the rib 26 is a stabilized bar or guide 80 for holding the ribs 20, 22, 24, and 26 in alignment against angular movement when the ribs are in an open position.

The entire garage is secured to a suitable, level piece of ground by means of spikes or the like as at 82 extending through suitable apertures in angulated brackets 83 welded to the standards 44. The ribs 20, 22, 24, and 26 are held in spaced relationship by means of spacer members 84 which includes rods 86 welded to the ribs and carrying rollers 88 for engagement with the next adjacent rib. The guide 80 keeps the ribs in alignment so that the rollers 88 will function correctly. The rollers hold the ribs in spaced relationship when the ribs are in a closed position. The construction of the spacers 84 can be best seen in Figure 7. The fabric covering 74 may be made in a plurality of parts which may be buttoned or otherwise fastened to each other by the fasteners such as are indicated by reference numeral 90. Likewise, fasteners 92 are utilized to secure the sections of the fabric covering 74 to the base runners 14 and to the ribs 26 and 34. The rib 34 may be secured to the ground by means of spikes 94 thereby holding that end of the garage in a closed position.

With the garage door formed by the frame members 20, 22, 24, and 26, together with the elastic band 72 and the fabric covering 74 in an open position the vehicle may be readily driven into the garage and out therefrom. However, with the door in a closed position, the vehicle will be fully protected from the deleterious effects of inclement weather. Handles 96 may be affixed to the section 66 of the rib 26 to thereby facilitate the raising of the door. Likewise, a latch 98 is secured in the ground and adapted to engage a fitting 100 mounted on the transverse member 66 to hold the rib 26 in a closed position.

Since from the foregoing the construction and advantages of this folding garage will be readily apparent, further description is believed to be unnecessary.

However, since numerous modifications will readily occur to those skilled in the art, after a consideration of the foregoing specification and accompanying drawings, it is not intended to limit the invention to the precise embodiment shown and described, but all suitable modifications and equivalents may be resorted to which fall within the scope of the appended claim.

What is claimed as new is as follows:

A folding garage comprising a pair of spaced base runners, frames secured to said runners and extending upwardly therefrom, substantially inverted U-shaped ribs having the ends thereof pivotally attached to common ends of said base runners, a fabric covering over said frames and said ribs and attached to said frames and said ribs, and a pair of springs each terminally attached to one of said frames above said base runners and to the outer rib adjacent the outer ends of said base runners, said springs holding said ribs in an open door position, said fabric covering having spaced elastic bands joining said ribs, a ground engaging stabilizer attached to said one of said frames and extending outwardly and downwardly therefrom, said ribs engaging said stabilizer whereby movement of the ribs is guided by said stabilizer, and a guide attached to said outer rib and extending perpendicular thereto, said guide holding said ribs in alignment when said ribs are in an open door position.

References Cited in the file of this patent

UNITED STATES PATENTS

| | | |
|---|---|---|
| 858,854 | Broch | July 2, 1907 |
| 953,965 | Moffitt | Apr. 5, 1910 |
| 1,576,942 | Beebe | Mar. 16, 1926 |
| 2,627,865 | Mitchell et al. | Feb. 10, 1953 |